United States Patent
Basso et al.

(10) Patent No.: US 10,164,540 B2
(45) Date of Patent: Dec. 25, 2018

(54) BI-DIRECTIONAL FEEDBACK PIN (71) Applicant: SEMICONDUCTOR COMPONENTS INDUSTRIES, LLC, Phoenix, AZ (US)

(72) Inventors: Christophe Basso, Pibrac (FR); Stephanie Cannenterre, Colomiers (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/181,666

(22) Filed: Jun. 14, 2016

(65) Prior Publication Data

US 2017/0358991 A1    Dec. 14, 2017

(51) Int. Cl.
*H02M 3/335*    (2006.01)
*H02M 1/00*    (2006.01)

(52) U.S. Cl.
CPC ......... *H02M 3/33523* (2013.01); *H02M 1/00* (2013.01); *H02M 2001/0003* (2013.01); *H02M 2001/0025* (2013.01)

(58) Field of Classification Search
CPC ......... H02M 3/33507; H02M 3/33523; H02M 3/335; H02M 3/33592; H02M 3/33576; H02M 3/33561; H02M 3/1563; H02M 3/157; H02M 3/1584; H02M 7/06; H02M 7/068; H02M 7/10; H02M 7/217; H02M 7/219; H02M 1/32; H02M 1/4208; H02M 2001/0032
USPC ................ 363/21.12, 21.14–21.18, 125–127
See application file for complete search history.

(56) References Cited

U.S. PATENT DOCUMENTS

| | | | | |
|---|---|---|---|---|
| 5,305,192 A | * | 4/1994 | Bonte | H02M 3/33507 323/285 |
| 5,982,640 A | * | 11/1999 | Naveed | H02M 3/33523 363/21.15 |
| 6,137,696 A | | 10/2000 | Hall et al. | |
| 6,721,192 B1 | | 4/2004 | Yang et al. | |
| 7,535,276 B2 | * | 5/2009 | Mlcousek | H02M 1/08 327/172 |
| 8,885,364 B2 | | 11/2014 | Wang et al. | |

(Continued)

OTHER PUBLICATIONS

ON Semiconductor, "Variable Off Time PWM Controller," NCP1351 Data Sheet, Rev. 3, Nov. 2007, 27 pages.

*Primary Examiner* — Jue Zhang
*Assistant Examiner* — Kevin H Sprenger
(74) *Attorney, Agent, or Firm* — Dickinson Wright PLLC (57) ABSTRACT

A controller for a power conversion circuit has a first current-reading circuit coupled for receiving a first feedback signal at a first circuit node and generating an internal feedback signal at a second circuit node inversely proportional to the first feedback signal. A second current-reading circuit is coupled for receiving a second feedback signal at the first circuit node and generating the internal feedback signal at the second circuit node inversely proportional to the second feedback signal. The first current-reading circuit generates the internal feedback signal inversely proportional to an electric current injected into the controller at the first circuit node. The second current-reading circuit generates the internal feedback signal inversely proportional to an electric current drawn from the controller at the first circuit node.

20 Claims, 7 Drawing Sheets

(56) References Cited

U.S. PATENT DOCUMENTS

| | | | | |
|---|---|---|---|---|
| 2002/0080625 A1* | 6/2002 | Goyhenetche | ........ | H02M 3/156 |
| | | | | 363/21.01 |
| 2012/0228934 A1* | 9/2012 | Singnurkar | ............ | G05F 1/561 |
| | | | | 307/24 |
| 2013/0021702 A1* | 1/2013 | Waltman | ................... | H02H 3/24 |
| | | | | 361/91.1 |
| 2013/0063112 A1* | 3/2013 | Yang | ....................... | H02M 1/32 |
| | | | | 323/282 |
| 2015/0326129 A1* | 11/2015 | Lin | ................... | H02M 3/33507 |
| | | | | 363/21.12 |
| 2017/0085182 A1* | 3/2017 | Colbeck | ............ | H02M 3/33507 |
| 2017/0288553 A1* | 10/2017 | Fahlenkamp | ..... | H02M 3/33515 |

* cited by examiner

BI-DIRECTIONAL FEEDBACK PIN

BACKGROUND

Electronic devices commonly require a direct current (DC) voltage of appropriate level for proper operation. A manufacturer of an electronic device provides for a power signal to be connected to the electronic device, which is used to power the semiconductor packages and other electric components of the electronic device. In many cases, the provided power signal is at a different voltage potential than the voltage required to operate the individual components of the electronic device. The manufacturer will generally provide a power conversion circuit to generate a steady DC voltage signal at a voltage potential usable by the electronic device. Switch-mode power supplies (SMPS) are common due to efficiency advantages.

An SMPS may be located within an electronic device, or located externally and connected to the electronic device by a cable. The cable is coupled to the electronic device using a detachable plug in some embodiments. The plug may include both power and data lines, e.g., when an electronic device is a cell phone, tablet computer, or other mobile device, and power is provided by a Universal Serial Bus (USB) interface. In some embodiments, electronic devices follow the USB Power Delivery (USB-PD) protocol to negotiate a voltage potential for power delivery by an external SMPS.

An SMPS operates by switching an input power signal on and off repeatedly to create a relatively high-frequency power signal. The switched power signal is routed through a transformer or inductor, and then rectified and filtered to create a steady DC power signal. The output power signal is commonly rectified by one or more diodes, or a transistor is used for synchronous rectification.

Figure 1A:
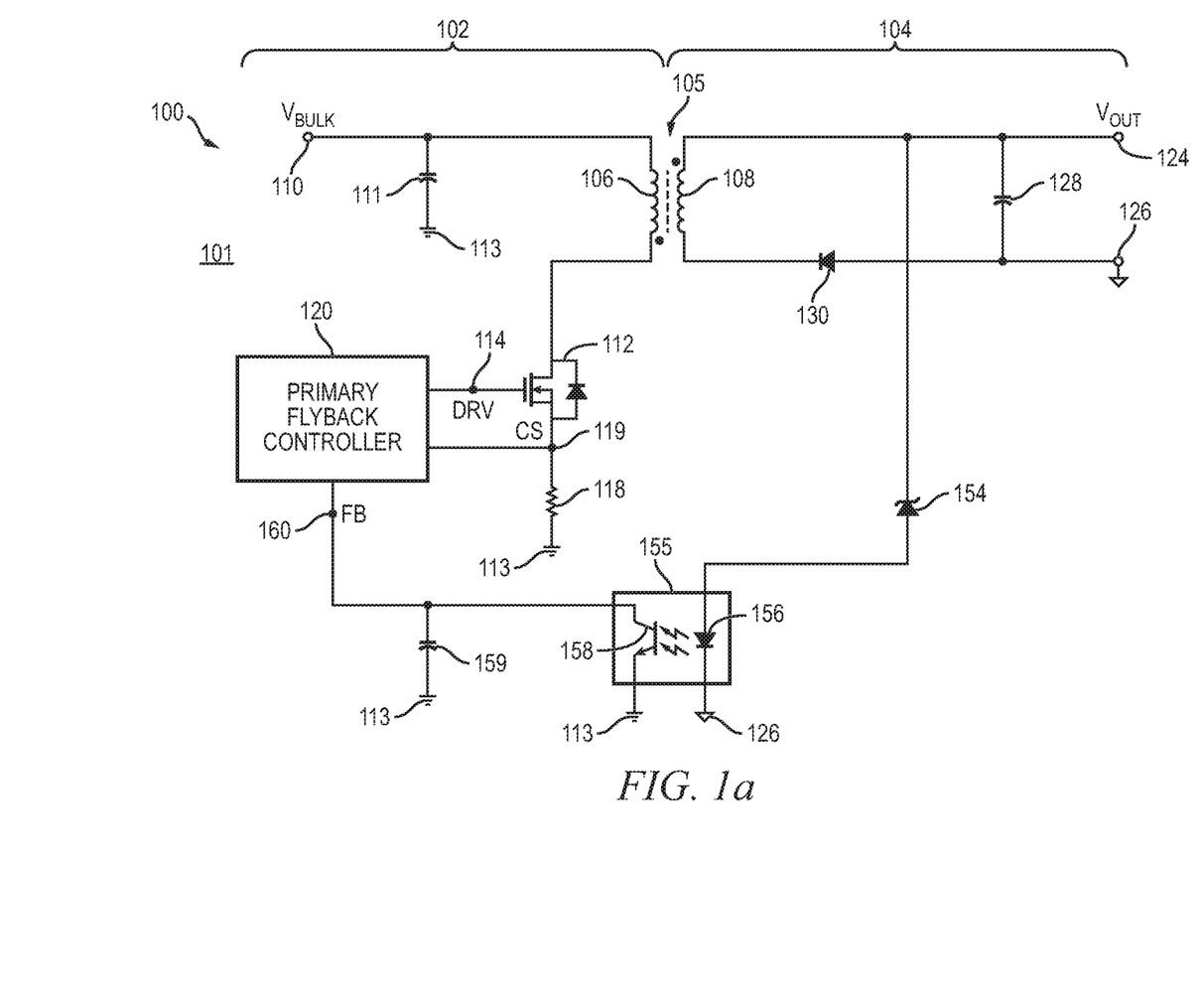
FIGS. 1a and 1b illustrate an exemplary circuit diagram of a flyback converter with primary and secondary side feedback.

A circuit diagram for one exemplary embodiment of a flyback SMPS 100 is illustrated in FIG. 1a. SMPS 100 is formed by components disposed on a circuit board, PCB, or other substrate 101. In some embodiments, SMPS 100 is split across multiple substrates 101. SMPS 100 is split into a primary side 102 and a secondary side 104, which are delineated by transformer 105. In non-isolated topologies, an inductor is used instead of transformer 105. Transformer 105 includes a primary winding 106 as part of primary side 102 and a secondary winding 108 as part of secondary side 104. Primary side 102 of SMPS 100 is made up of the components electrically connected to primary winding 106. Secondary side 104 of SMPS 100 is made up of the components electrically connected to secondary winding 108. Transformer 105 provides DC isolation between primary side 102 and secondary side 104. Alternating current (AC) signals through primary winding 106 are transferred to secondary winding 108 by magnetic coupling, while any DC offset is substantially ignored.

Primary side 102 includes a power input at bulk voltage ($V_{BULK}$) node 110. In some embodiments, $V_{BULK}$ node 110 receives an AC power signal provided by an electric utility at, e.g., 110 or 230 volts AC, which has been rectified. The AC electric signal is routed to a residence, commercial office building, or other premises by power mains, and input to the electronic device including SMPS 100 by plugging the device into a wall outlet. A diode bridge or other rectifier circuit rectifies the input AC mains signal to include positive voltage values at $V_{BULK}$ node 110. In other embodiments, a power signal is provided to $V_{BULK}$ node 110 by other means, e.g., from solar cells or a battery pack. A capacitor 111 is coupled between $V_{BULK}$ node 110 and ground node 113 to further filter the input power signal. Ground node 113 operates as the ground reference voltage for the electrical components of primary side 102.

Electric current from $V_{BULK}$ node 110 through primary winding 106 to ground node 113 is turned on and off by primary MOSFET 112. Primary MOSFET 112 includes a drain terminal coupled to primary winding 106 opposite $V_{BULK}$ node 110, a gate terminal coupled to primary flyback controller 120 at circuit node 114 (DRV), and a source terminal coupled to current sense resistor 118 at current sense (CS) node 119. The source and drain terminals of primary MOSFET 112 are conduction terminals, and the gate terminal is a control terminal. Controller 120 turns on, or enables electric conduction through, primary MOSFET 112 by providing a positive voltage potential at the gate terminal of the MOSFET via DRV node 114 coupled to a drive output of the controller. In some embodiments, additional driver circuitry is coupled between controller 120 and the gate of MOSFET 112. When primary MOSFET 112 is turned on, electric current flows from $V_{BULK}$ node 110 to ground node 113 through primary winding 106, primary MOSFET 112, and resistor 118 in series. Controller 120 turns off primary MOSFET 112 by outputting a ground voltage potential to the gate of primary MOSFET 112. While primary MOSFET 112 is off, no significant current flows from $V_{BULK}$ node 110 through primary winding 106.

In the ideal case, an n-channel MOSFET exhibits zero resistance when its gate has a positive voltage potential, and exhibits infinite resistance when its gate is at ground potential. MOSFET 112 is an n-channel MOSFET that operates as a switch opened and closed by a control signal from controller 120 coupled to the MOSFET's gate terminal at DRV node 114. A switch, e.g., MOSFET 112, being closed is also referred to as the switch being "on," because electric current is able to flow between conduction terminals of the switch. An open switch is referred to as being "off" because current does not flow significantly between the conduction terminals of the switch. While the primary switch of SMPS 100 is illustrated as an n-channel MOSFET, other types of electronically controlled switches, e.g., bipolar-junction transistors (BJTs), p-channel MOSFETs, gallium arsenide transistors, junction gate field-effect transistor, other types of field-effect transistors (FETs), and other types of electronic switches, are used in other embodiments. FETs include source and drain terminals, which are conduction terminals, and a gate terminal as a control terminal. BJTs include emitter and collector terminals, which are conduction terminals, and a base terminal as a control terminal.

Controller 120 determines when to switch primary MOSFET 112 by observing the magnitude of current through primary winding 106. Resistor 118 creates a voltage potential difference between ground node 113 and CS node 119 when electric current flows through the resistor. The voltage potential across resistor 118, as observed at CS node 119, is approximately proportional to the current through primary winding 106. CS node 119 is coupled to a current sense input pin of controller 120. Controller 120 observes the voltage potential at CS node 119 to determine the electric current magnitude through primary winding 106.

While controller 120 has primary MOSFET 112 turned on, electric current through primary winding 106 increases approximately linearly and magnetizes transformer 105. When controller 120 turns off primary MOSFET 112, electric current through primary winding 106 is substantially stopped. The magnetic energy stored in transformer 105 while MOSFET 112 is closed is output as electric current through secondary winding 108 while MOSFET 112 is open, creating a positive voltage potential at voltage output ($V_{OUT}$) node 124 relative to ground node 126. Ground node 126 operates as the ground reference voltage for electrical components of secondary side 104. SMPS 100 is an isolated topology, meaning a separate primary side ground node 113 and secondary side ground node 126 are used. The voltage potential of ground node 126 is allowed to float relative to ground node 113.

The voltage potential at $V_{OUT}$ node 124 charges capacitor 128 and powers additional circuit components of an electronic device connected to SMPS 100 as a load. The cycle repeats when controller 120 turns on primary MOSFET 112 to again magnetize transformer 105. Capacitor 128 provides power to $V_{OUT}$ node 124 while primary MOSFET 112 is on, and transformer 105 is being magnetized. Diode 130 rectifies current through secondary winding 108 by reducing electric current flowing from $V_{OUT}$ node 124 to ground node 126 through secondary winding 108 while transformer 105 is being magnetized from primary side 102.

Feedback is provided from secondary side 104 to primary side 102 by Zener diode 154 and optocoupler 155. Optocoupler 155 includes an LED 156 and a phototransistor 158. If the voltage potential at $V_{OUT}$ node 124 exceeds the Zener voltage of Zener diode 154 summed with the voltage drop of LED 156, current flows from $V_{OUT}$ node 124 to ground node 126 through Zener diode 154 and LED 156 in series. Photons emitted by LED 156 hit phototransistor 158, which turns on the phototransistor and increases the coupling of feedback (FB) node 160 to ground node 113. FB node 160 is coupled to a feedback input pin or terminal of controller 120. Capacitor 159 filters the voltage potential at FB node 160. As current through LED 156 is increased, the coupling of FB node 160 to ground node 113 through phototransistor 158 is increased, and the voltage potential of FB node 160 is further reduced.

As controller 120 observes voltage potential at FB node 160 being reduced, the controller understands that voltage potential at $V_{OUT}$ node 124 is at or above a desired output voltage potential. Controller 120 takes measures as configured to reduce power transfer from primary side 102 to secondary side 104, e.g., reducing on-time of MOSFET 112 or modifying the switching frequency of DRV signal 114.

Optocoupler 155 in FIG. 1a provides feedback from secondary side 104. In other embodiments, as shown with SMPS 166 in FIG. 1b, feedback is provided from primary side 102 using an auxiliary winding 168 of transformer 105. Auxiliary winding 168 is wrapped around a common magnetic core 169 with primary winding 106 and secondary winding 108. Auxiliary winding 168 is rectified by diode 170 to charge capacitor 171 and generate an auxiliary voltage at $V_{DD}$ node 202. The auxiliary voltage at $V_{DD}$ node 202 is routed to provide power to controller 120. When the auxiliary voltage at $V_{DD}$ node 202 exceeds the Zener voltage of Zener diode 172, a feedback current is generated through resistors 176 and 178 to ground node 113.

Figure 1B:
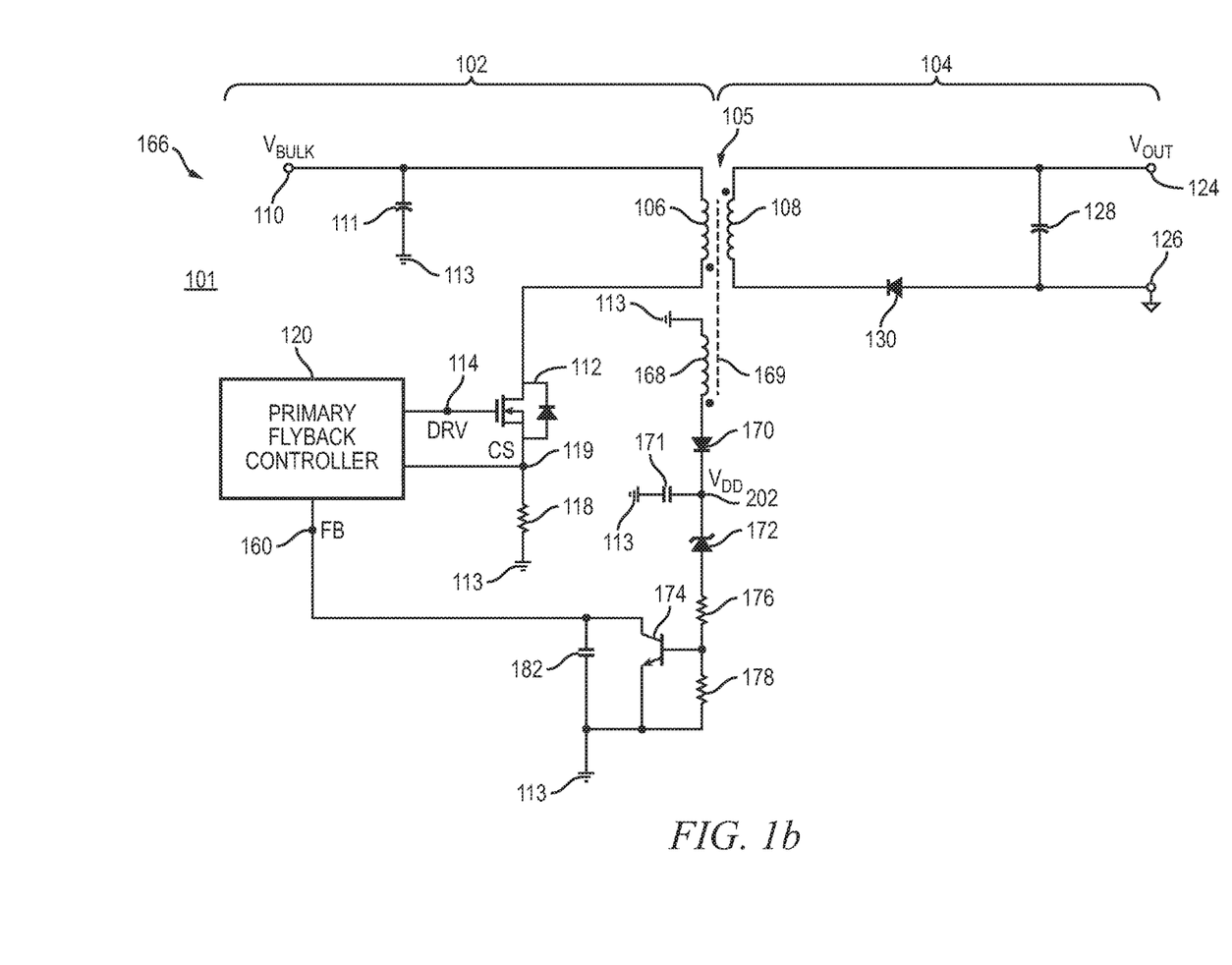

Auxiliary winding 168 is referenced to ground node 113, so separate isolation by optocoupler 155 is not required. However, the voltage provided by resistors 176 and 178 has a direct relationship with the current output by SMPS 166 at $V_{OUT}$ node 124, rather than the inverse relationship of FB node 160 with optocoupler 155 in FIG. 1a. Coupling the anode of Zener diode 172 to FB node 160 would result in current being injected into controller 120, whereas phototransistor 158 results in electric current drawn from controller 120.

To use the same controller 120 integrated circuit with the primary side feedback in FIG. 1b as with the secondary side feedback in FIG. 1a, and with non-isolated SMPS topologies, the feedback current from auxiliary winding 168 is inverted by BJT 174. Resistors 176 and 178 create a voltage divider to calibrate the voltage potential at the base terminal of BJT 174 for a given current through Zener diode 172. Capacitor 182 filters the voltage potential at FB node 160.

BJT 174 creates an inverse relationship between $V_{OUT}$ node 124 and the collector terminal of BJT 174 coupled to FB node 160, so that the same controller 120 feedback pin can be used with secondary side feedback, as in FIG. 1a, and primary side feedback, as in FIG. 1b. With either secondary side feedback or primary side feedback, the feedback signal received by controller 120 at FB node 160 has an inverse relationship with $V_{OUT}$ node 124. However, a BJT 174 external to controller 120 is used to invert the feedback signal with primary side feedback. The additional hardware components required when primary side feedback is used, or in non-isolated topologies, increases the cost of SMPS 166 and increases the overall design footprint.

SUMMARY

A need exists for a power supply controller usable with feedback signals that are directly or inversely related to power supply output voltage without the need for hardware components to invert the feedback signal. Accordingly, in one embodiment, the present disclosure is a controller for a power conversion circuit comprising a first current-reading circuit coupled for receiving a first feedback signal at a first circuit node and generating an internal feedback signal at a second circuit node inversely proportional to the first feedback signal. A second current-reading circuit is coupled for receiving a second feedback signal at the first circuit node and generating the internal feedback signal at the second circuit node inversely proportional to the second feedback signal.

In another embodiment, the present disclosure is a controller for a power conversion circuit comprising a first current mirror including an input coupled to a terminal of the controller and an output of the first current mirror coupled to a feedback circuit node. A second current mirror includes an input coupled to the terminal of the controller. A third current mirror includes an input coupled to an output of the second current mirror. An output of the third current mirror is coupled to the feedback circuit node.

In another embodiment, the present disclosure is a method of generating a voltage signal comprising the steps of providing a controller including a feedback terminal and a feedback circuit node, forming a first current-reading circuit coupled between the feedback terminal and feedback circuit node, and forming a second current-reading circuit coupled between the feedback terminal and feedback circuit node.

DETAILED DESCRIPTION OF THE DRAWINGS

The following describes one or more embodiments with reference to the figures, in which like numerals represent the same or similar elements. While the figures are described in terms of the best mode for achieving certain objectives, the description is intended to cover alternatives, modifications, and equivalents as may be included within the spirit and scope of the disclosure.

Figure 2A:
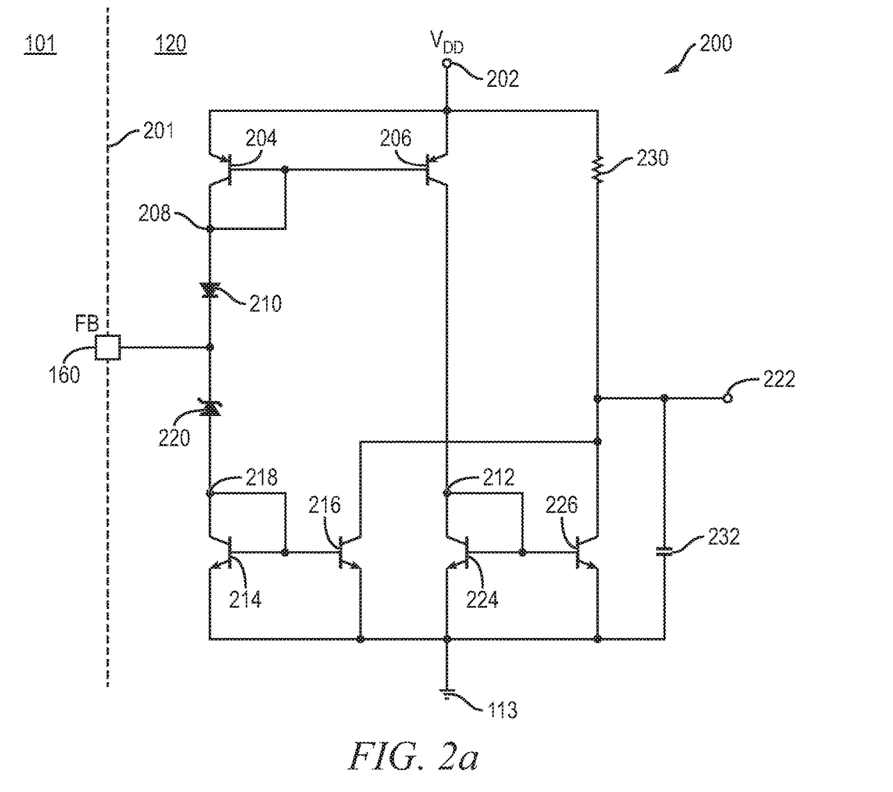
FIGS. 2a-2c illustrate an SMPS controller with a bi-directional feedback circuit.

FIG. 2a illustrates a feedback circuit 200 within controller 120 that allows the controller to be used with either primary side feedback or secondary side feedback without additional hardware to invert the feedback signal with primary side feedback. An external feedback mechanism coupled to FB node 160 is able to draw electric current out of or sink electric current into controller 120 via FB node 160, and controller 120 interprets the feedback signal properly in either case. In FIG. 2a, FB node 160 is represented as a pin of controller 120, FB pin 160. Line 201 runs through FB pin 160, representing the edge of the semiconductor die of controller 120. Line 201 delineates between components formed on the semiconductor die of controller 120 on the right side of line 201, and components disposed alongside the controller on substrate 101 on the left side of line 201.

Feedback circuit 200 is coupled between $V_{DD}$ node 202 and ground node 113. $V_{DD}$ node 202 represents a positive voltage potential input via a $V_{DD}$ pin of controller 120, and ground node 113 represents a ground reference voltage input to controller 120. In some embodiments, a voltage signal at $V_{DD}$ node 202 is generated from auxiliary winding 168.

BJTs 204 and 206 are PNP BJTs. The emitter terminals of BJTs 204 and 206 are both coupled to $V_{DD}$ node 202. The base terminals of BJTs 204 and 206 are both coupled to circuit node 208. The collector terminal of BJT 204 is also coupled to circuit node 208. The collector terminal of BJT 206 is coupled to circuit node 212. Diode 210 includes an anode coupled to circuit node 208 and a cathode coupled to FB pin 160. BJTs 204 and 206 are configured as a current mirror. Electric current drawn from controller 120 through FB pin 160 flows from $V_{DD}$ node 202, out of the collector terminal of BJT 204, and through diode 210. An electric current of similar magnitude is generated by BJT 206 because a common control signal is coupled to the base terminals of both BJTs 204 and 206, turning on both BJTs to a similar degree. An electric current out of the collector terminal of BJT 206 to circuit node 212 is approximately equal to an electric current drawn from FB pin 160. BJTs 204 and 206 form a current mirror with an input of the current mirror coupled to FB pin 160 through diode 210 and an output of the current mirror coupled to circuit node 212.

BJTs 224 and 226 are NPN BJTs configured as a current mirror similar to BJTs 204 and 206. The current mirror of BJTs 224 and 226 has an input coupled to circuit node 212 and an output coupled to internal FB node 222. The current mirror of BJTs 224 and 226 is coupled in series with the current mirror of BJTs 204 and 206 between FB pin 160 and internal FB node 222. BJTs 224 and 226 each include emitter terminals coupled to ground node 113, and base terminals coupled to circuit node 212. The collector terminal of BJT 224 is coupled to circuit node 212. The collector terminal of BJT 226 is coupled to internal FB node 222. Electric current drawn from controller 120 at FB pin 160 and then mirrored at the collector terminal of BJT 206 to circuit node 212 flows through BJT 224 to ground node 113. BJTs 224 and 226 have their control terminals connected together, and the current through BJT 224 is mirrored through BJT 226 from $V_{DD}$ node 202 to ground node 113. The current through BJT 226 from $V_{DD}$ node 202 to ground node 113 flows through resistor 230, which creates a voltage potential drop across the resistor observed at internal FB node 222.

The voltage potential at internal FB node 222 has an inverse relationship with current drawn from controller 120 at FB pin 160. A larger current drawn from FB pin 160 results in a greater current through BJT 204, a greater current through BJT 206, a greater current through BJT 224, a greater current through BJT 226, and a greater current through resistor 230. Thus, the voltage across resistor 230 is greater as current drawn from FB pin 160 becomes greater, and the voltage potential at internal FB node 222 is lower. Capacitor 232 is coupled between internal FB node 222 and ground node 113 to filter the signal at internal FB node 222.

BJTs 214 and 216 are NPN BJTs, and are configured into a current mirror similar to BJTs 224 and 226. BJTs 214 and 216 each include emitter terminals coupled to ground node 113, and base terminals coupled to circuit node 218. The collector terminal of BJT 214 is coupled to circuit node 218. The collector terminal of BJT 216 is coupled to internal FB node 222. Zener diode 220 includes an anode coupled to circuit node 218 and a cathode coupled to FB pin 160. When a feedback mechanism sinks electric current into controller 120 through FB pin 160, the voltage potential of FB pin 160 rises to exceed the Zener voltage of Zener diode 220, and current flows from FB pin 160 to the collector terminal and base terminal of BJT 214. Zener diode 220 operates as a voltage clamp. In other embodiments, an active clamp or other clamping circuit structure is used in place of Zener diode 220.

BJTs 214 and 216 form a current mirror with an input of the current mirror coupled to FB pin 160 through Zener diode 220 and an output of the current mirror coupled to internal FB node 222. The current mirror of BJTs 214 and 216 is coupled between FB pin 160 and internal FB node 222 in parallel with the current mirrors formed with BJTs 204, 206, 224, and 226. The base terminal of BJT 216 is coupled to the base terminal of BJT 214, and a similar electric current flows from $V_{DD}$ node 202 to ground node 113 through BJT 216 as is flowing into FB pin 160 and through BJT 214. The current through BJT 216 flows through resistor 230 and creates a greater voltage potential drop from $V_{DD}$ node 202 to internal FB node 222 as current injected into FB pin 160 increases. Therefore, the voltage potential across resistor 230 is greater as current injected into FB pin 160 becomes greater, and the voltage potential at internal FB node 222 is lower with a larger electric current injected into FB pin 160.

Whether a feedback mechanism results in electric current being injected into or drawn from FB pin 160, the result is current from $V_{DD}$ node 202 flowing to ground node 113 through resistor 230 at a magnitude proportional to the feedback current at FB pin 160. If a feedback mechanism draws current from FB pin 160, the current is mirrored by the current mirror formed by BJT 204 and 206, and then by the current mirror formed by BJTs 224 and 226, to pull a proportional current from $V_{DD}$ node 202 through resistor 230. If a feedback mechanism injects current into FB pin 160, the current is mirrored by the current mirror formed by BJTs 214 and 216 to pull current from $V_{DD}$ node 202 through resistor 230. Either primary or secondary side feedback is implemented without external circuitry to invert the correlation between $V_{OUT}$ node 124 and FB pin 160. Controller 120 works properly whether a feedback signal at FB pin 160 has a direct or an inverse relationship with $V_{OUT}$ node 124.

Figure 2B:
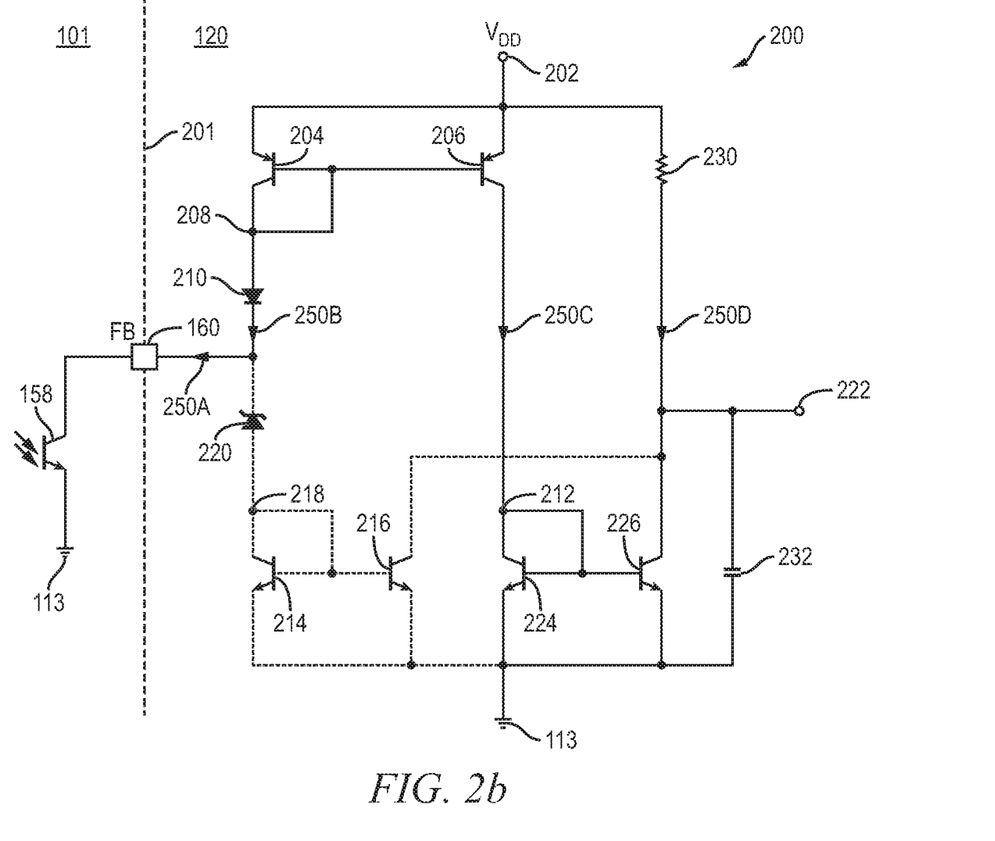

FIG. 2b illustrates controller 120 and feedback circuit 200 with a secondary side feedback mechanism connected to FB pin 160. Phototransistor 158 of optocoupler 155 is illustrated coupled between FB pin 160 and ground node 113. As the voltage potential of $V_{OUT}$ node 124 increases, current through LED 156 increases. Light emitted by LED 156 increases electric current 250A drawn from FB pin 160 because of increased coupling to ground node 113 through phototransistor 158. Current 250A flows from diode 210 as current 250B. Current 250B is approximately equal to current 250A due to Zener diode 220 substantially blocking current from ground node 113 through BJT 214. The electric current paths through the current mirror of BJTs 214 and 216 are illustrated as dotted lines to indicate that no significant current flows through the dotted signal paths in the configuration of FIG. 2b.

When used with common secondary side feedback mechanisms, current 250A is drawn from FB pin 160. The voltage potential of FB pin 160 is substantially fixed at the voltage potential of $V_{DD}$ node 202 minus the voltage potential from the emitter terminal to the collector terminal of BJT 204 in saturation mode and the voltage drop of diode 210. The substantially fixed-voltage design provides a low impedance connection to the emitter terminal of phototransistor 158. The substantially fixed voltage at the collector terminal of phototransistor 158 reduces the effect of a pole formed with the phototransistor. Thus, FB circuit 200 coupled to phototransistor 158 has a relatively high crossover frequency for the feedback loop. The feedback current through optocoupler 155 is decreased without significantly sacrificing bandwidth of the power supply. Standby power consumption is decreased.

Current 250B reduces the voltage potential at circuit node 208, i.e., the base terminals of BJTs 204 and 206, relative to the BJT's emitter terminals. The reduction in voltage potential of circuit node 208 turns on BJT 204 to allow current 250B to continue to flow from $V_{DD}$ node 202 through BJT 204 and diode 210. The reduction in voltage potential of circuit node 208 turns on BJT 206 to allow electric current 250C to flow from $V_{DD}$ node 202 through BJT 206 to circuit node 212. The magnitude of electric current 250C is approximately equal to the magnitude of electric current 250B because of similar biasing of BJTs 204 and 206.

Electric current 250C increases the voltage potential at circuit node 212, which is coupled to the base terminals of BJTs 224 and 226. Current 250C results in the voltage potential at the base terminals of BJTs 224 and 226 being greater than the emitter terminals of BJTs 224 and 226 by at least the turn-on voltage of the BJTs. Electric current 250D is pulled through BJT 226 and resistor 230. Electric current 250D is approximately equal to electric current 250C due to similar biasing of both BJTs 224 and 226. Electric current 250D flows through resistor 230 and creates a voltage potential difference between $V_{DD}$ node 202 and internal FB node 222. Electric current 250D results in a voltage potential reduction at internal FB node 222 that is substantially proportional to electric current 250A drawn from FB pin 160, as well as electric currents 250B, 250C, and 250D.

Secondary side feedback is implemented using feedback circuit 200 coupled to $V_{OUT}$ node 124 through optocoupler 155. Phototransistor 158 is turned on by LED 156 which includes a current through the LED proportional to a voltage potential of $V_{OUT}$ node 124. Electric current 250A drawn from FB pin 160 by phototransistor 158 causes a proportional reduction in voltage potential at internal FB node 222. The voltage potential at internal FB node 222 is inversely proportional to electric current drawn from FB pin 160.

Figure 2C:
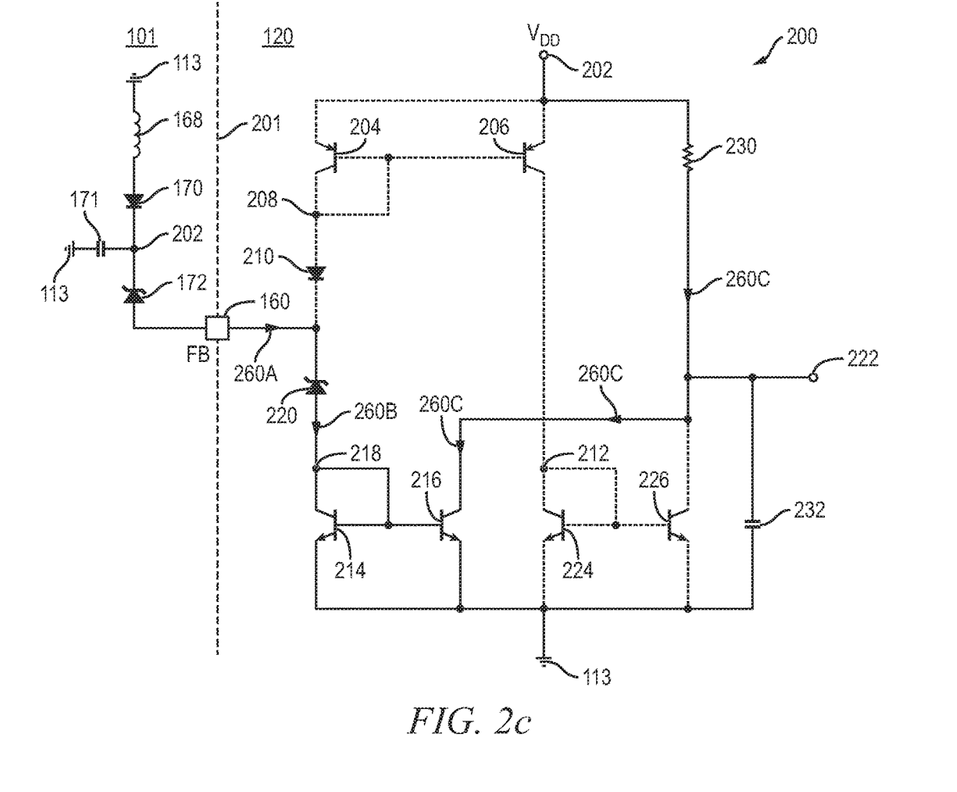

In FIG. 2c, feedback circuit 200 is connected to auxiliary winding 168 of transformer 105 as a primary side feedback mechanism. Increased output voltage potential at $V_{OUT}$ node 124 increases the voltage potential observed at $V_{DD}$ node 202, and injects electric current 260A into FB pin 160 through Zener diode 172. Current 260A raises the potential of FB pin 160 to exceed the turn-on voltage potential of Zener diode 220, and current 260B flows through Zener diode 220. The magnitude of electric current 260B is approximately equal to the magnitude of electric current 260A due to diode 210 substantially blocking electric current through BJTs 204 and 206. The conduction paths through the current mirrors formed by BJTs 204, 206, 224, and 226 are illustrated as dotted lines to indicate that the current through the dotted paths is approximately zero.

Electric current 260B increases the voltage potential of circuit node 218, which is coupled to the base terminals of BJTs 214 and 216. The voltage potential at circuit node 218 turns on BJT 216 by raising the voltage drop across the base-emitter junction of BJT 216 to greater than the turn-on voltage of BJT 216. Electric current 260C is pulled through BJT 216 and resistor 230 in series. Electric current 260C is approximately equal to electric current 260B because BJTs 214 and 216 are similarly biased. Electric current 260C flows through resistor 230 and causes a voltage potential drop across resistor 230 that is proportional to the magnitude of current 260C. A larger magnitude electric current 260C causes a larger voltage drop across resistor 230, thus reducing the voltage potential at internal FB node 222 by a greater amount. Electric current 260C is approximately equal to currents 260A and 260B, which are proportional to the voltage potential of $V_{OUT}$ node 124 due to control by auxiliary winding 168.

Controller 120 in FIG. 2c uses primary side feedback by coupling FB pin 160 to auxiliary winding 168 of transformer 105 through Zener diode 172. Internal FB node 222 includes a voltage potential that is inversely proportional to the magnitude of current injected into FB pin 160 of controller 120. Controller 120 is able to properly interpret a feedback signal for a power supply that causes current to flow into FB pin 160. An external transistor is not used to invert the feedback signal. Feedback current 260A is injected into FB pin 160 from auxiliary winding 168.

Similar to secondary side feedback illustrated in FIG. 2b, FB pin 160 has a substantially fixed voltage potential when used with secondary side feedback in FIG. 2c. The voltage potential of FB pin 160 in FIG. 2c is approximately equal to the Zener voltage of Zener diode 220 plus the voltage from the collector terminal to the emitter terminal of BJT 214 in saturation mode.

Feedback circuit 200 allows injecting electric current into FB pin 160 or drawing electric current from FB pin 160, and produces a linear voltage at internal FB node 222 that is similar in either case. FB pin 160 has a relatively low input impedance which improves bandwidth of a power supply using controller 120, and helps reduce standby power consumption.

While controller 120 is illustrated in use with a flyback converter, controller 120 with feedback circuit 200 is usable with buck, boost, and other types of power supplies. Feedback circuit 200 is used with both isolated and non-isolated SMPS topologies in various embodiments.

While current mirrors are illustrated in a relatively simple form, other embodiments use additional circuit elements with the current mirrors, or other current mirror topologies, to improve current matching, compensate for base terminal current losses, or provide other benefits. Some embodiments utilize MOSFETs, or other types of transistors, instead of BJTs.

Figure 3:
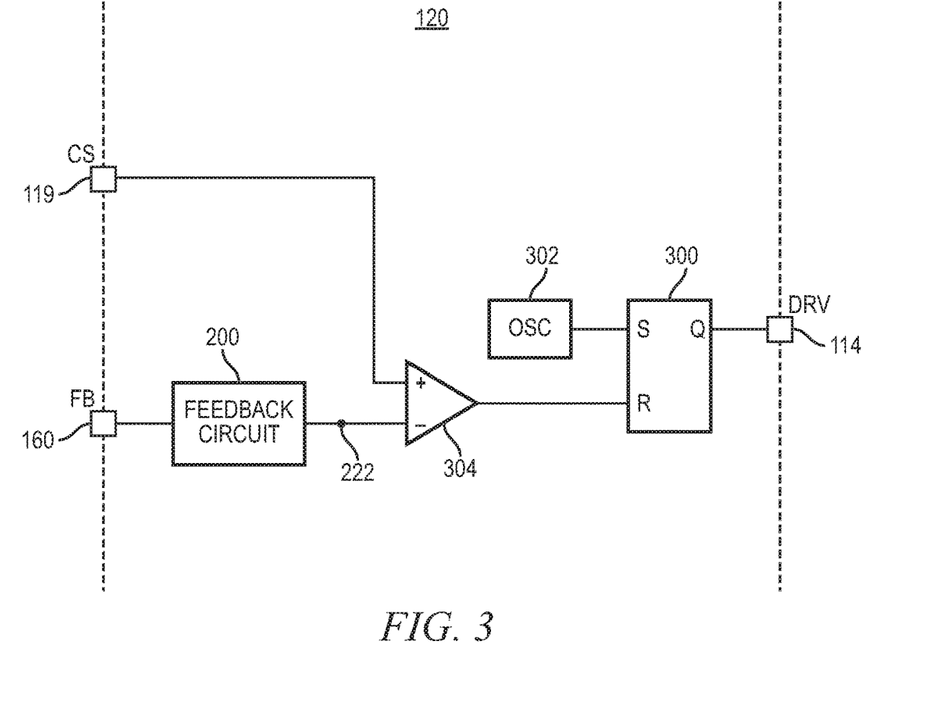
FIG. 3 illustrates control of a drive output of the SMPS controller based on the bi-directional feedback circuit.

FIG. 3 illustrates one embodiment of DRV signal 114 controlled by feedback circuit 200. DRV signal 114 is generated by set-reset (SR) latch 300. The Q output of an SR latch is asserted as a logic one value when a logic one value is received at a set input (S). The Q output of an SR latch is de-asserted to a logic zero value when a logic one value is received at a reset input (R) of the SR latch. The Q output of an SR latch holds a previous output value until a logic one is received on one of the set or reset inputs. Oscillator 302 is connected to the set input of SR latch 300. Oscillator 302 outputs a square wave, or other appropriate signal, to assert a logic one value and set SR latch 300 periodically. The period of oscillator 302 sets the power cycle period for SMPS 100.

Comparator 304 includes an output coupled to the reset input of SR latch 300. Comparator 304 turns of MOSFET 112 each power cycle of SMPS 100 by asserting a signal to the reset input of SR latch 300. The timing of MOSFET 112 being turned off each power cycle is determined by the voltage potential at internal FB node 222. In some embodiments, a voltage divider is used to reduce the voltage potential from internal FB node 222 to comparator 304.

Each power cycle, as transformer 105 is magnetically charged, the voltage potential at CS node 119 rises approximately linearly. The voltage potential at CS node 119 rises until the voltage potential at CS node 119 exceeds the voltage potential at internal FB node 222. When the voltage potential of CS node 119 exceeds the voltage potential of internal FB node 222, the output of comparator 304 is asserted to the reset input of SR latch 300, turning off MOSFET 112. The voltage potential of CS node 119 stops rising after MOSFET 112 is turned off, and begins rising again when oscillator 302 sets SR latch 300.

Internal feedback signal 222 determines how high CS node 119 is allowed to rise each power cycle of SMPS 100 before MOSFET 112 is turned off. A lower voltage potential of internal FB node 222 reduces the on-time of MOSFET 112 each power cycle, which reduces the overall power transfer from primary side 102 to secondary side 104 through transformer 105. A higher voltage potential of internal FB node 222 allows CS node 119 to rise for longer each power cycle, thus leaving MOSFET 112 on for a longer amount time each power cycle. Feedback circuit 200 properly handles current drawn from or injected into FB pin 160, and internal FB node 222 is properly reduced whichever direction a feedback mechanism produces electric current. The reduction of voltage potential at internal FB node 222 reduces the on-time of MOSFET 114 by moving up the time when CS node 119 exceeds the internal FB node to reset SR latch 300. Other methods of controlling DRV signal 114 based on internal FB node 222 are used in other embodiments.

In feedback circuit 200, current mirrors operate as current-reading circuits that receive an external feedback signal coupled to controller 120 at FB pin 160, and generate a linear internal feedback voltage potential inversely proportional to an external feedback current signal. Two current-reading circuits are provided. A first current-reading circuit, made up of BJTs 204, 206, 224, and 226 in the embodiment of FIGS. 2a-2c, receives a signal as current is drawn from FB pin 160, and generates a voltage signal at internal FB node 222 that is inversely proportional to the magnitude of the feedback current drawn from FB pin 160. A second current-reading circuit, made up of BJTs 214 and 216 in the embodiment of FIGS. 2a-2c, receives a signal as current is injected into FB pin 160, and generates a voltage signal at internal FB node 222 that is inversely proportional to the magnitude of the feedback current injected into FB pin 160. Having two separate current-reading circuits allows a voltage at internal FB node 222 that is inversely proportional to the magnitude of feedback current whether the external feedback current is injected into or drawn from FB pin 160.

Figure 4:
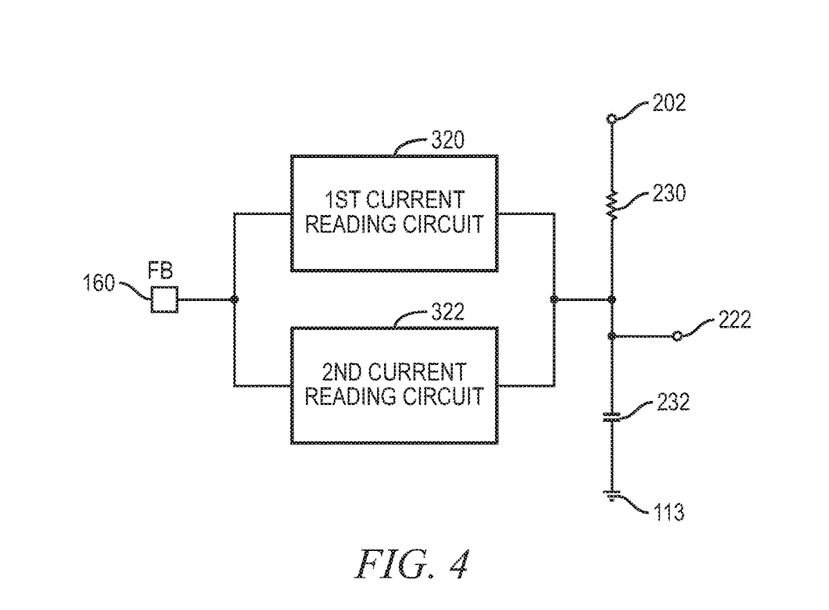
FIG. 4 illustrates using two current-reading devices to form a feedback circuit.

FIG. 4 illustrates a block diagram showing two current-reading circuits 320 and 322. First current-reading circuit 320 reacts to current drawn from FB pin 160 by drawing current through resistor 230 from $V_{DD}$ node 202 while second current-reading circuit 322 remains substantially idle. Second current-reading circuit 322 reacts to current injected into FB pin 160 by drawing current through resistor 230 from $V_{DD}$ node 202 while first current-reading circuit 320 remains substantially idle. Using two current-reading circuits 320 and 322 results in a similar linear voltage at internal FB node 222 whether a feedback current is injected into or drawn from FB pin 160

In other embodiments, the current mirrors formed from BJTs 204, 206, 214, 216, 224, and 226 are replaced with different types of current-reading circuits. In one embodiment, shunt regulators are used to read the current at FB pin 160 and generate an inversely proportional voltage potential whether the current is injected into or drawn from FB pin 160. The shunt regulators are formed using operational amplifiers in some embodiments.

Figure 5:
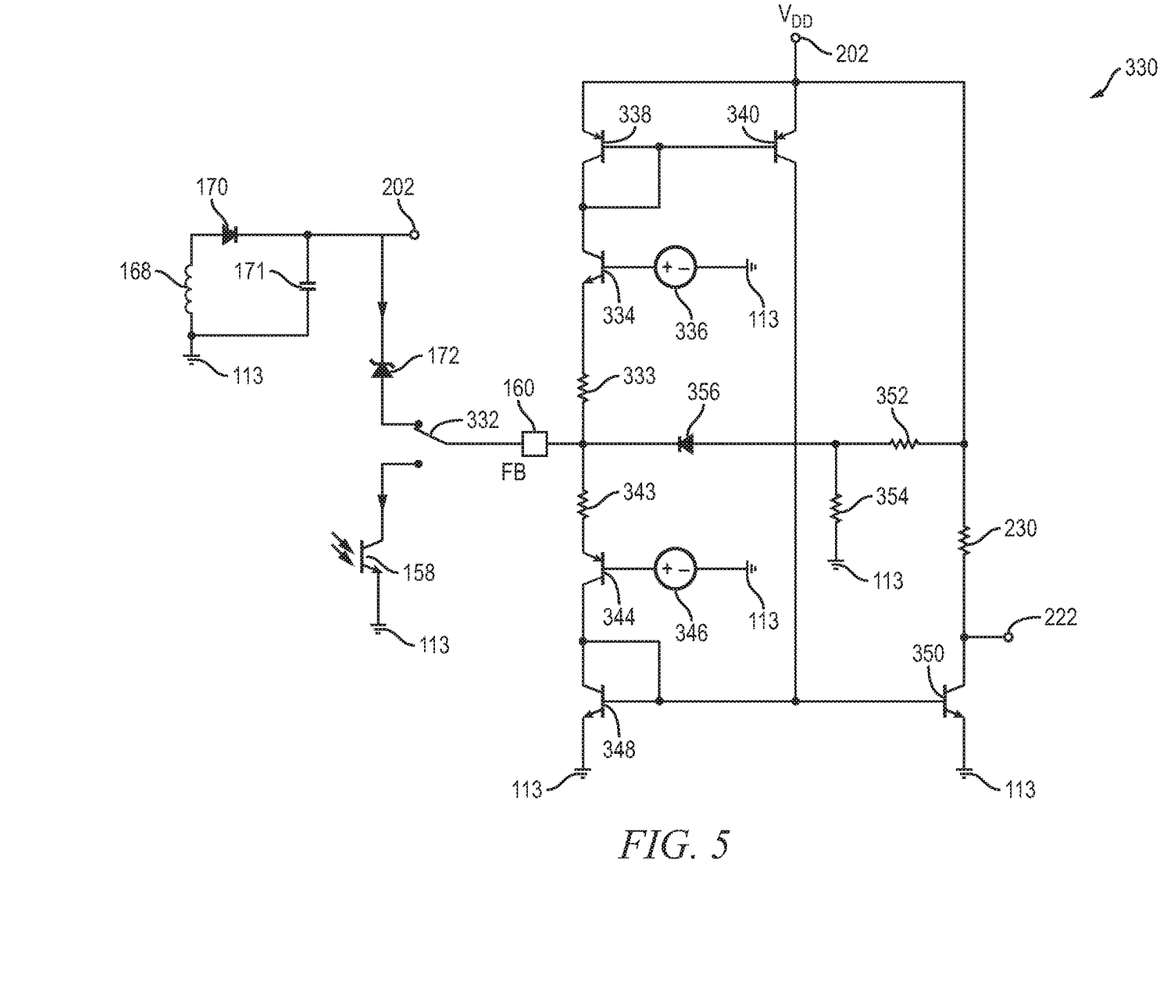
FIG. 5 illustrates forming the current-reading devices using shunt regulators.

FIG. 5 illustrates one specific embodiment of a feedback circuit 330 that utilizes shunt regulators in the current-reading circuits. Switch 332 illustrates that electric current can either be injected into FB pin 160 from auxiliary winding 168 or drawn from FB pin 160 by photodiode 158. A first shunt regulator formed by BJT 334 and voltage 336 is connected to FB pin 160 by resistor 333 as part of a first current-reading circuit. BJTs 338 and 340 are coupled between $V_{DD}$ node 202 and BJT 334. A second shunt regulator formed by BJT 344 and voltage 346 is coupled to FB pin 160 through resistor 343. BJTs 348 and 350 are coupled between BJT 344 and ground node 113. Resistors 352 and 354 form a voltage divider with the divided voltage coupled to FB pin 160 through diode 356.

While one or more embodiments have been illustrated and described in detail, the skilled artisan will appreciate that modifications and adaptations to those embodiments may be made without departing from the scope of the present disclosure.

What is claimed is:

1. A controller for a power conversion circuit, comprising:
   a first current-reading circuit including an input connected to a first circuit node for receiving a first feedback signal into the first circuit node and generating an internal feedback signal from an output at a second circuit node inversely proportional to the first feedback signal; and
   a second current-reading circuit including an input connected to the first circuit node for enabling a second feedback signal to be drawn from the first circuit node and generating the internal feedback signal from an output at the second circuit node inversely proportional to the second feedback signal, wherein the input of the first current-reading circuit and the input of the second current-reading circuit are both connected to the first circuit node, and the output of the first current-reading circuit and the output of the second current-reading circuit are both connected to the second circuit node.

2. The controller of claim 1, wherein the first current-reading circuit is configured to generate the internal feedback signal inversely proportional to a first electric current injected into the controller at the first circuit node.

3. The controller of claim 2, wherein the second current-reading circuit is configured to generate the internal feedback signal inversely proportional to a second electric current drawn from the controller at the first circuit node.

4. The controller of claim 1, further including a drive output of the controller configured to be controlled by the internal feedback signal.

5. The controller of claim 1, wherein the first current-reading circuit includes a first current mirror coupled between the first circuit node and second circuit node.

6. The controller of claim 1, further including:
a clamp circuit coupled between the first circuit node and first current-reading circuit; and
a diode coupled between the first circuit node and second current-reading circuit.

7. A controller for a power conversion circuit, comprising:
a first current-reading circuit coupled to a first circuit node for receiving a first feedback signal into the first circuit node and generating an internal feedback signal at a second circuit node inversely proportional to the first feedback signal, wherein the first current-reading circuit includes a first current mirror coupled between the first circuit node and second circuit node; and
a second current-reading circuit coupled to the first circuit node for enabling a second feedback signal to be drawn from the first circuit node and generating the internal feedback signal at the second circuit node inversely proportional to the second feedback signal, wherein the second current-reading circuit includes:
 (a) a second current mirror having an input coupled to the first circuit node, and
 (b) a third current mirror having an input coupled to an output of the second current mirror and an output coupled to the second circuit node.

8. A controller for a power conversion circuit, comprising:
a first current mirror including an input coupled to a terminal of the controller and an output of the first current mirror coupled to a feedback circuit node;
a second current mirror including an input coupled to the terminal of the controller; and
a third current mirror including an input coupled to an output of the second current mirror and an output of the third current mirror coupled to the feedback circuit node.

9. The controller of claim 8, further including a clamp circuit coupled between the terminal of the controller and the input of the first current mirror.

10. The controller of claim 9, wherein the clamp circuit includes a Zener diode.

11. The controller of claim 8, further including a diode coupled between the terminal of the controller and the input of the second current mirror.

12. The controller of claim 8, further including a resistor coupled between a voltage input terminal of the controller and the feedback circuit node.

13. The controller of claim 8, wherein the first current mirror includes:
a first transistor comprising a first conduction terminal coupled to the terminal of the controller, a control terminal coupled to the terminal of the controller, and a second conduction terminal coupled to a power supply terminal; and
a second transistor comprising a first conduction terminal coupled to the feedback circuit node, a control terminal coupled to the terminal of the controller, and a second conduction terminal coupled to the power supply terminal.

14. The controller of claim 8, wherein the second current mirror includes,
 (a) a first transistor comprising a first conduction terminal coupled to a first power supply terminal of the controller, a second conduction terminal coupled to the terminal of the controller, and a control terminal coupled to the terminal of the controller, and
 (b) a second transistor comprising a first conduction terminal coupled to the first power supply terminal of the controller, and a control terminal coupled to the terminal of the controller,
and the third current mirror includes,
 (c) a third transistor comprising a first conduction terminal coupled to a second conduction terminal of the second transistor, a control terminal coupled to the second conduction terminal of the second transistor, and a second conduction terminal coupled to a second power supply terminal of the controller, and
 (b) a fourth transistor comprising a first conduction terminal coupled to the second power supply terminal of the controller, a control terminal coupled to the second conduction terminal of the second transistor, and a second conduction terminal coupled to the feedback circuit node.

15. A method of generating a voltage signal, comprising:
providing a controller including a feedback terminal and a feedback circuit node;
forming a first current-reading circuit coupled between the feedback terminal and the feedback circuit node adapted for receiving a first feedback signal into the feedback terminal to generate an internal feedback signal at the feedback circuit node; and
forming a second current-reading circuit coupled between the feedback terminal and the feedback circuit node, wherein the first current-reading circuit includes an input connected to the feedback terminal and an output connected to the feedback circuit node, and the second current-reading circuit includes an input connected to the feedback terminal and an output connected to the feedback circuit node, and the second current-reading circuit is adapted for enabling a second feedback signal to be drawn from the feedback terminal to generate the internal feedback signal at the feedback circuit node.

16. The method of claim 15, further including disposing a phototransistor adjacent to the controller and coupled to the feedback terminal of the controller.

17. The method of claim 15, further including disposing a transformer comprising an auxiliary winding adjacent to the controller with the auxiliary winding coupled to the feedback terminal of the controller.

18. The method of claim 15, further including providing a resistor coupled to the feedback circuit node.

19. The method of claim 18, further including:
drawing electric current through the resistor using the first current-reading circuit when electric current is injected into the feedback terminal; and
drawing electric current through the resistor using the second current-reading circuit when electric current is drawn from the feedback terminal.

20. The method of claim 15, further including:
providing a Zener diode coupled between the feedback terminal and first current mirror; and providing a diode coupled between the feedback terminal and second current mirror.

\* \* \* \* \*